United States Patent Office 2,750,382
Patented June 12, 1956

2,750,382

BASIC ESTERS OF 1,12 - DIMETHYL - 6 - ALKOXY-1,2,3,4,9,10,11,12 -OCTAHYDROPHENANTHRENE-1 - CARBOXYLIC ACIDS

Roy H. Bible, Jr., Chicago, and Willard M. Hoehn, Wilmette, Ill., assignors, by mesne assignments, to G. D. Searle & Co., Skokie, Ill., a corporation of Delaware No Drawing. Application December 3, 1953, Serial No. 396,064

9 Claims. (Cl. 260—247.2)

The present invention relates to basic esters of 1,12 - dimethyl - 6 - alkoxy - 1,2,3,4,9,10,11,12 - octahydrophenanthrene - 1 - carboxylic acids. Specifically, it relates to esters of the general structural formula

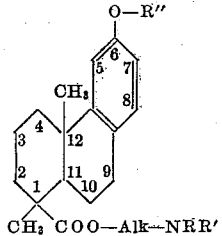

In this formula, the radical NRR' can represent a dialkylamino radical or a heterocyclic radical containing a nuclear nitrogen atom attached to the radical Alk, wherein the radical Alk represents a lower alkylene radical, and wherein R" is a lower alkyl radical.

In the foregoing structural formula the radicals R, R' and R" can represent such lower alkyl radicals as methyl, ethyl, straight and branch chained propyl, butyl, amyl, hexyl, heptyl and octyl. The radical NRR' can also constitute a heterocyclic ring of the morpholino, thiamorpholino, pyrrolidino, piperidino, and N'-alkylpiperazino series.

The organic bases of the foregoing type form salts which are non-toxic in therapeutic dosage with a variety of inorganic and strong organic acids including sulfuric, phosphoric, hydrochloric, hydrobromic, sulfamic, citric, ascorbic and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The new class of esters described in the present application possesses valuable cardiovascular, secretagogue and anti-inflammatory properties. Specifically, they have a myotropic and choleretic action. Further, they have certain cortisone-like actions as evidenced by a lympholytic effect. Quaternary ammonium salts derived therefrom are active ganglion blocking agents.

The following examples illustrate in detail certain of the compound which comprise this invention and methods for their production. However, this invention is not to be construed thereby as limited in spirit or in scope. It will be apparent to those skilled in the art that numerous modifications in materials and in methods can be practiced without departing from the invention. In each of these examples, temperatures are given in degrees centigrade (° C.), relative amounts of materials in parts by weight and pressures in millimeters (mm.) of mercury.

Example 1

A mixture of 100 parts of O-methylpodocarpyl chloride, 100 parts of β-diethylaminoethanol, and 20 parts of benzene is refluxed for one hour. The mixture is cooled and diluted with water and ether. The ether layer is separated and washed several times with water. The washed ether solution is dried over anhydrous calcium sulfate and filtered, and the solvent is stripped. The residue is then distilled from a short-path apparatus at about 180° C. and 0.05 mm. pressure. The β-diethylaminoethyl ester of 1,12 - dimethyl - 6 - methoxy - 1,2,3,4,9,10,11,12 - octahydrophenanthrene - 1 - carboxylic acid thus obtained has a specific rotation of +101° as determined in a 1% ethanol solution. The refractive index, $n_{25}^D$, is 1.5283. The ultraviolet absorption spectrum shows a maximum at about 280 millimicrons with a molecular extinction coefficient of about 2400. The compound has the structural formula

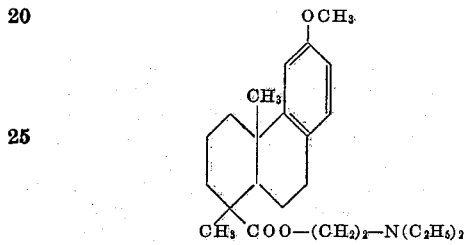

Example 2

A mixture of 10 parts of O-methylpodocarpyl chloride, 10 parts of γ-diethylaminopropanol, and 2 parts of benzene is refluxed for an hour, cooled and diluted with water and ether. The ether layer is washed with water, dried over anhydrous calcium sulfate, filtered and freed from solvent. On short-path distillation, the γ-diethylaminopropyl ester of 1,12 - dimethyl - 6 - methoxy - 1,2,3,4,9,10,11,12 - octahydrophenanthrene - 1 - car - boxylic acid is obtained at about 180° C. and 0.07 mm. pressure. The refractive index, $n_{25}^D$, is 1.5264. The specific rotation of an 0.5% ethanol solution is +97°. An ultraviolet maximum is observed at about 278 millimicrons with a molecular extinction coefficient of about 2500.

Example 3

A mixture of 5 parts of O-methylpodocarpyl chloride, 5 parts of β-diisopropylaminoethanol and 1 part of benzene is refluxed for an hour, chilled and diluted with water and ether. The ether layer is washed repeatedly with water, dried over anhydrous magnesium sulfate, filtered and concentrated in vacuo. The residue is submitted to short-path distillation. At about 191° C. and 0.07 mm. pressure, the β-diisopropylaminoethyl ester of 1,12 - dimethyl - 6 - methoxy - 1,2,3,4,9,10,11,12 - octa - hydrophenanthrene - 1 - carboxylic acid is obtained as an oil which crystallizes on standing. The crystals melt at about 90.5–94° C. The ultraviolet absorption spectrum shows a maximum at about 280 millimicrons with a molecular extinction coefficient of 2500. The specific rotation of a 1% ethanol solution is +96°.

Example 4

A mixture of 100 parts of O-methylpodocarpyl chloride, 100 parts of N-(β-hydroxyethyl)morpholine and 20 parts of benzene is refluxed for an hour and then treated with ice water and ether. The organic layer is washed several times with water, dried over anhydrous magnesium sulfate, filtered and freed from solvent by vacuum distillation. On short-path distillation, the β-morpholinoethyl ester of 1,12-dimethyl-6-methoxy-1,2,3,4, 9,10,11,12 - octahydrophenanthrene - 1 - carboxylic acid is obtained at about 220° C. and 0.11 mm. pressure. On standing the oily distillate crystallizes slowly. A 1% ethanol solution shows a specific rotation of +95°. The ultraviolet absorption spectrum shows a maximum at 280 millimicrons with a molecular extinction coefficient of 2400. Infrared maxima are observed at 5.83, 6.22, 6.36, 6.68, 6.9, 7.25, 7.52 and 8.93 microns and a broad band at 11.7 microns. The compound has the structural formula

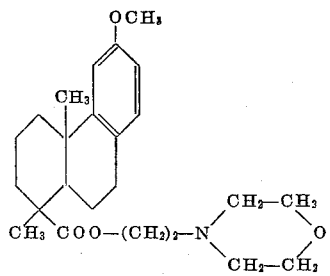

*Example 5*

A mixture of 100 parts of O-methylpodocarpyl chloride, 100 parts of N-(β-hydroxypropyl)piperidine, and 20 parts of benzene is heated at reflux temperature for 45 minutes and then treated with ice water and ether. The organic layer is separated, washed with water, dried over anhydrous magnesium sulfate, filtered and evaporated. The residue is distilled at about 190–200° C. and 0.07 mm. pressure to yield the α-methyl-β-piperidinoethyl ester of 1,12-dimethyl-6-methoxy-1,2,3,4,9,10,11,12 - octahydrophenanthrene - 1 - carboxylic acid. The specific rotation of an 0.5% ethanol solution is +96°. The ultraviolet absorption spectrum shows a maximum at 279 millimicrons with a molecular extinction coefficient of 2500. The compound has the structural formula

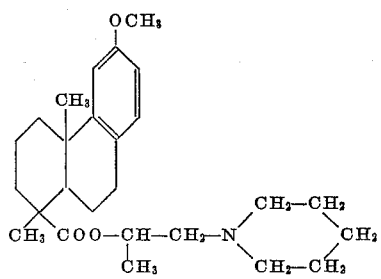

*Example 6*

To a solution of 40 parts of the methyl ester of podocarpic acid and 12 parts of sodium hydroxide in 110 parts of water and 160 parts of 95% ethanol are added, all at once, 33 parts of diethyl sulfate. The reactants are quickly mixed and then allowed to stand until a thick white precipitate forms. This precipitate is collected on a filter, washer with dilute ethanol, and recrystallized from methanol to yield methyl O-ethyl-podocarpate as thin, colorless needles melting at about 144–147.5° C.

A mixture of 50 parts of this product, 50 parts of potassium hydroxide, 50 parts of water and 190 parts of methanol is heated in an autoclave at 150° C. for 5 hours. The mixture is cooled and then acidified with dilute hydrochloride acid. A gum separates which is allowed to stand until it has crystallized. The solid is collected and recrystallized once from dilute isopropanol. The infrared absorption spectrum of this acid has bands at 5.92, 6.25, 6.38, 6.70, 6.85, 7.91, 8.0 and 9.5 microns. The ultraviolet absorption spectrum has a maximum at 281 millimicrons.

To a cold solution of 30 parts of this acid in 300 parts of dry ether are added 25 parts of thionyl chloride. The mixture is allowed to stand for 24 hours. The solvent and the excess thionyl chloride are stripped under vacuum over a steam bath. Benzene is added to the residue and then distilled off. This treatment with benzene, which removes the final traces of thionyl chloride, is repeated several times. The residue consists of O-ethyl-podocarpyl chloride, which is used directly in the following reaction.

A mixture of 10 parts of this acid chloride, 9 parts of N-(β-hydroxyethyl)pyrrolidine and 2 parts of benzene is heated at reflux temperature for 90 minutes, cooled and diluted with water and ether. The ether layer is separated and washed repeatedly with water. The washed ether solution is dried over anhydrous calcium sulfate, filtered and concentrated under vacuum. The residue is then distilled from a short-path apparatus at about 180° C. and 0.07 mm. pressure. An 0.7% ethanol solution shows a specific rotation of +97°. The ultraviolet absorption spectrum shows a maximum at 280 millimicrons and a molecular extinction coefficient of 2350. Infrared maxima are observed at 5.83, 6.22, 6.36, 6.68, 6.9, 7.25 and 7.52 microns. The β-pyrrolidinoethyl ester of 1,12-dimethyl - 6 - ethoxy - 1,2,3,4,9,10,11,12 - octahydro - phenanthrene-1-carboxylic acid thus obtained has the structural formula

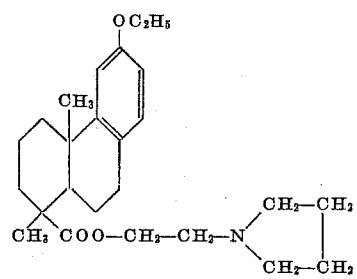

We claim:
1. A compound of the structural formula

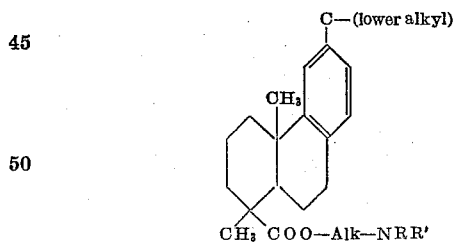

wherein Alk is a lower alkylene radical separating the adjoining oxygen and nitrogen atoms by at least two carbon atoms and NRR' is a member of the class consisting of di-(lower)alkylamino, pyrrolidino, piperidino and morpholino radicals.

2. A compound of the structural formula

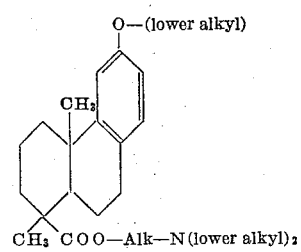

wherein Alk is a lower alkylene radical separating the adjoining oxygen and nitrogen atoms by at least two carbon atoms.

3. A compound of the structural formula

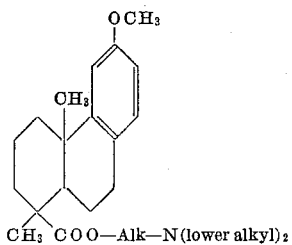

wherein Alk is a lower alkylene radical separating the adjoining oxygen and nitrogen atoms by at least two carbon atoms.

4. A compound of the structural formula

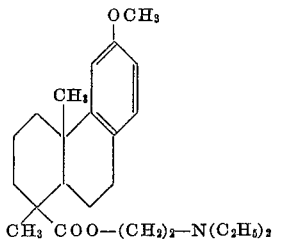

5. A compound of the structural formula

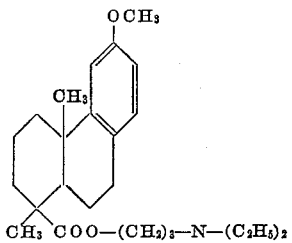

6. A compound of the structural formula

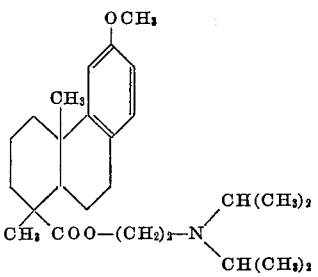

7. A compound of the structural formula

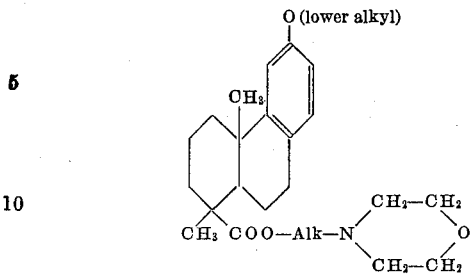

wherein Alk is a lower alkylene radical separating the adjoining oxygen and nitrogen atoms by at least two carbon atoms.

8. A compound of the structural formula

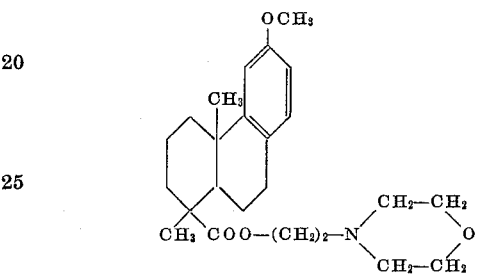

9. A compound of the structural formula

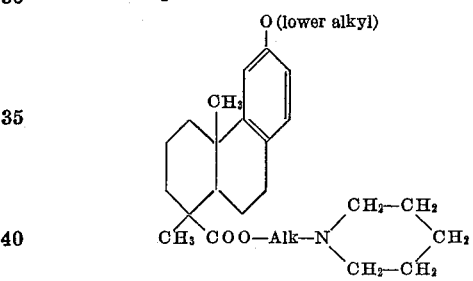

wherein Alk is a lower alkylene radical separating the adjoining oxygen and nitrogen atoms by at least two carbon atoms.

References Cited in the file of this patent

UNITED STATES PATENTS 2,562,351     Burtner _____ July 31, 1951

OTHER REFERENCES

Elsevier's Encyclopedia of Org. Compounds, vol. 13, p. 978 (1946).